US006798993B1

(12) United States Patent
Adams et al.

(10) Patent No.: US 6,798,993 B1
(45) Date of Patent: Sep. 28, 2004

(54) WDM OPTICAL NETWORKS ARRANGED FOR INTERNETWORKING WITH PACKET NETWORKS

(75) Inventors: Laura Ellen Adams, Basking Ridge, NJ (US); Malathi Veeraraghavan, Atlantic Highlands, NJ (US)

(73) Assignee: Lucent Technologies Inc., Murray HIll, NJ (US)

( * ) Notice: Subject to any disclaimer, the term of this patent is extended or adjusted under 35 U.S.C. 154(b) by 0 days.

(21) Appl. No.: 09/574,501

(22) Filed: May 19, 2000

(51) Int. Cl.[7] .............................................. H04J 14/02
(52) U.S. Cl. ............................ 398/74; 398/46; 398/47; 398/75; 398/82; 398/83; 398/115; 398/116; 398/69
(58) Field of Search ................................ 359/117, 119, 359/124, 139, 128, 130; 398/46, 47, 74, 75, 115, 116, 82, 83, 69

(56) References Cited

U.S. PATENT DOCUMENTS

| | | | | |
|---|---|---|---|---|
| 3,983,507 | A | * | 9/1976 | Tang et al. ................... 372/105 |
| 5,303,078 | A | * | 4/1994 | Brackett et al. ............. 359/139 |
| 5,530,575 | A | * | 6/1996 | Acampora et al. .......... 359/128 |
| 5,724,167 | A | * | 3/1998 | Sabella ........................ 359/128 |
| 5,729,548 | A | * | 3/1998 | Holender ..................... 370/474 |
| 5,748,349 | A | * | 5/1998 | Mizrahi ....................... 359/130 |
| 5,777,763 | A | * | 7/1998 | Tomlinson, III ............ 359/130 |
| 5,796,501 | A | * | 8/1998 | Sotom et al. ................ 359/119 |
| 5,808,767 | A | * | 9/1998 | Williams et al. ............ 359/152 |
| 5,999,288 | A | * | 12/1999 | Ellinas et al. ............... 359/119 |
| 6,075,631 | A | * | 6/2000 | Bala et al. ................... 359/124 |
| 6,111,673 | A | * | 8/2000 | Chang et al. ................ 359/123 |
| 6,226,111 | B1 | * | 5/2001 | Chang et al. ................ 359/119 |
| 6,388,782 | B1 | * | 5/2002 | Stephens et al. ............. 398/79 |
| 6,532,088 | B1 | * | 3/2003 | Dantu et al. .................. 398/43 |
| 6,628,617 | B1 | * | 9/2003 | Karol et al. ................. 370/237 |
| 2001/0028488 | A1 | * | 10/2001 | Kim et al. .................... 359/124 |

OTHER PUBLICATIONS

Veeraraghavan et al, "Internetworking Connectionless and Connetion Oriented Networks", IEEE Communications Magazine, Dec. 1999, pp130–138.*
"Optical Networking", by Al–Salameh, D. Y. et al., *Bell Labs Technical Journal*, Jan.–Mar. 1998, pps. 39–61.

* cited by examiner

*Primary Examiner*—Leslie Pascal (57) ABSTRACT

A connectionless packet network and an optical WDM network are interconnected by one or more optical interface modules (gateways) that include both optical to electrical interfaces, as well as a connection management module, or control element, that is arranged to control the OADM's and the configuration of lasers and port assignments within the gateways, such that a route through the optical network to a desired endpoint is selected. The OADM's can be programmed, (i.e., locally or remotely controlled by the control element) such that the wavelengths that can be added or dropped by an OADM can be changed, thereby allowing routes to be established through the optical network, from an originating gateway to a destination gateway. In addition, the optical interface modules can include a plurality tunable lasers that can be controlled such that routes can be established through the optical network without requiring changes to the routing table that associates particular endpoints with particular ports. The system can be operated in a "provisioned" mode, where connections are set up a priori (i.e., before actual traffic flow starts), or in a "switched" mode, where connections are set up on a session by session (call by call) basis. The interface modules can be integrated with the components otherwise present in conventional packet routers, or housed separately in intelligent gateways that interconnect conventional packet routers with OADM's on an optical WDM network.

19 Claims, 7 Drawing Sheets

WDM OPTICAL NETWORKS ARRANGED FOR INTERNETWORKING WITH PACKET NETWORKS

FIELD OF THE INVENTION

This invention relates to optical networks that use wavelength division multiplexing (WDM), and, more specifically, to internetworking of such networks with connectionless (CL) packet networks such as internet protocol (IP) networks.

BACKGROUND OF THE INVENTION

Known optical networks use wavelength division multiplexing (WDM) for point-to-point communication between nodes disposed on an optical transmission medium such as an optical fiber. Data, i.e. information bearing packets associated with a plurality of individual calls, is used to modulate a laser having a wavelength corresponding to a particular WDM channel, and the optical signal is inserted onto the transmission medium in an optical add/drop module (OADM) at one node. The optical signal is transported on the medium to a destination node, where another OADM extracts the optical signal, whereupon demodulation is performed to recover the data.

An arrangement for internetworking of optical and connectionless packet networks such as Internet Protocol (IP) networks, is described in a copending application Ser. No. 09/333406 and filed Jun. 15, 1999 and entitled "Wideband Optical Packet Ring Network", assigned to the same assignee as the present invention, which is incorporated herein by reference. In the aforementioned application, specially equipped routers in the packet networks are arranged to have optical interfaces to OADM's in the optical network. These routers, sometimes referred to as "optical gateways" or simply "gateways", include hardware and software that performs several functions. First, each gateway includes a packet framer and an optical transceiver that converts an "electrical" stream of packets into an optical signal that modules a laser having a particular wavelength. Second, each gateway is functionally arranged to control the OADM's in order to implement routing tables that associate specific destinations on the optical network (i.e., remote gateways connected to other OADM's) with a particular "port" on the router. The laser output, which is available at the above-mentioned particular port on the gateway, is then combined with (added to) other wavelengths on the optical transmission medium to form the WDM signal. At the destination gateway, the portion of the optical signal at the particular wavelength is then extracted (dropped) from the other wavelengths on the optical transmission medium, and the optical signal is reconverted to a stream of packets in another optical transceiver, which can then be transmitted on toward a desired destination. The path which an IP packet takes through WDM network is determined by the wavelength on which it enters the WDM network and the state of the particular ones of the OADMs through which the packet travels.

Figure 1:
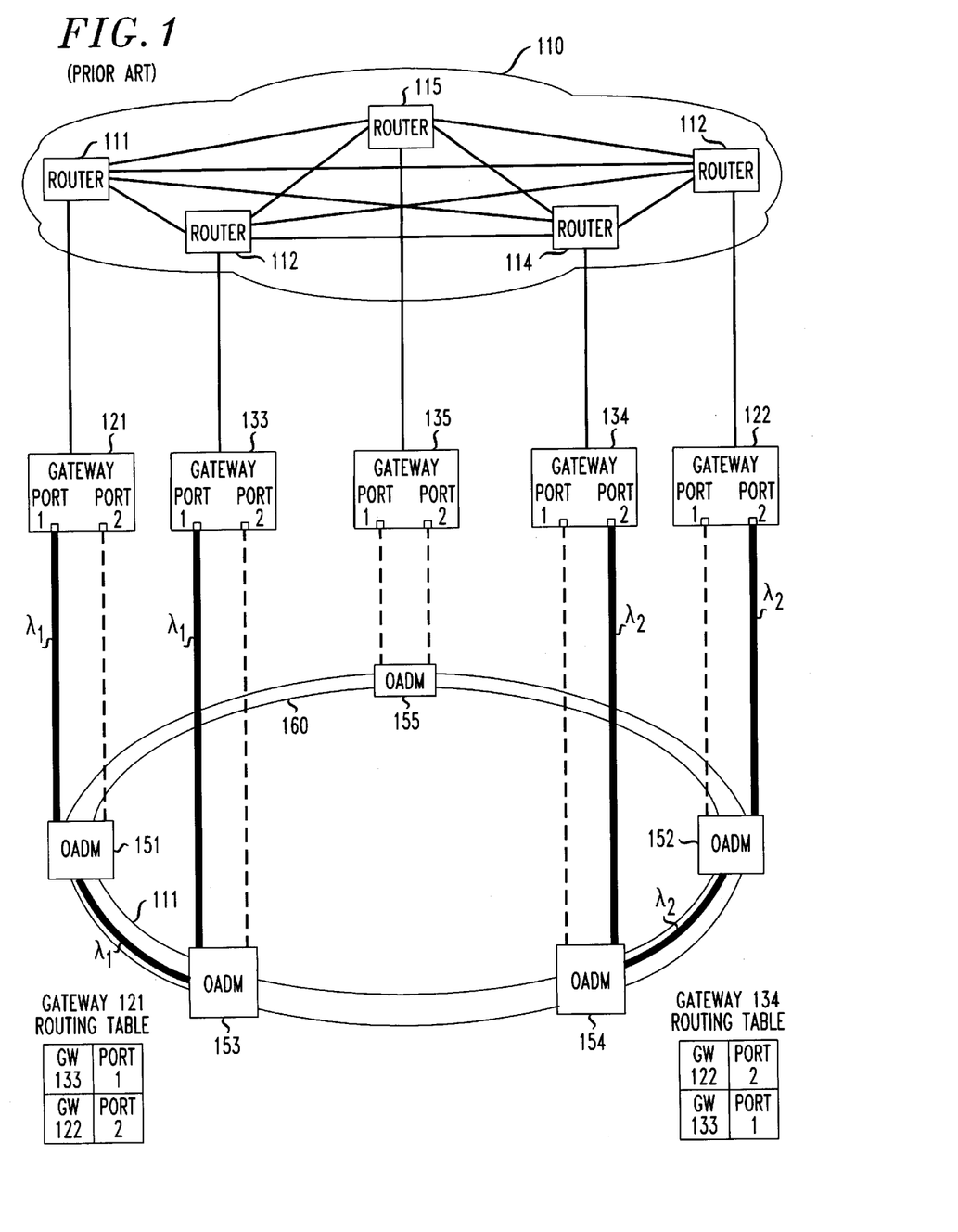
FIG. 1 discussed above, is a diagram illustrating a prior art arrangement for internetworking between a packet network, such as an IP network, and an optical WDM network.

A prior art arrangement of the type just described is illustrated in FIG. 1. A packet network 110 includes a plurality of interconnected routers, such as conventional routers 111 and 112, and gateways 121 and 122, which are routers that interface both with conventional routers and also with particular OADM's in an optical WDM network designated generally at 150. Thus, gateway 121 has a connection to OADM 151, while gateway 122 has a connection to OADM 152. An optical WDM transmission medium 160 with counter-clockwise optical flow, interconnects OADM 151 to OADM 153, OADM 153 to OADM 154, and OADM 154 to OADM 152. OADMs 153 and 154 are, in turn, connected to gateways 133 and 134, respectively, which may be part of packet network 110 or may be part of a different packet network.

For simplicity of description, assume that gateways 121, 122, 133 and 134 each have two ports, called port 1 and port 2, each arranged as part of an electrical to optical interface at a specific wavelength $\lambda 1$ and $\lambda 2$, respectively. In a real implementation (such as an implementation using All-Wave™ fiber technology available from Lucent Technologies), each gateway could be arranged to simultaneously support many more WDM channels; (e.g., as many as 2000 channels) on transmission medium 160. Each router in packet network 110, including gateways 121, 122, 133, 134 and 135, has a routing table, which specifies which port an incoming packet (i.e., a packet received from another router in the packet network) should be applied to in order to be transported on the optical network to a particular destination gateway. Thus, for example, as shown in FIG. 1, the routing tables for gateways 121 and 134 may be as set forth in tables 1 and 2 below, respectively:

TABLE 1

Gateway 121 Routing Table

| Destination | Port Assignment |
|---|---|
| Gateway 133 | Port 1 |
| Gateway 122 | Port 2 |

TABLE 2

Gateway 134 Routing Table

| Destination | Port Assignment |
|---|---|
| Gateway 133 | Port 1 |
| Gateway 122 | Port 2 |

In the example of FIG. 1, assume that a first "connection" from gateway 121 to gateway 133 is desired. This connection can be established through the optical WDM network by applying packets received at gateway 121 (from other routers in the packet network 110) to port 1, which is associated in Table 1 with the desired destination (gateway 133). The packets are used to modulate a laser having a wavelength $\lambda 1$ associated with port 1, and are inserted via OADM 151 onto transmission medium 160, which in this case is arranged to "add" the laser output to the signals already travelling in a counterclockwise direction on transmission medium 160. In this example, OADM 153 is arranged to extract (drop) the optical signal on transmission medium 160 at wavelength $\lambda 1$ from the other *WDM signals on the transmission medium, so that the information bearing packets can be recovered by demodulation in a transceiver in gateway 133. Also assume that a second connection from gateway 134 to gateway 122 is desired. This connection can be established through the optical WDM network by applying packets received at gateway 134 (from other routers in another packet network not shown in FIG. 1) to port 2, which is -associated in Table 2 with the desired destination (gateway 122). The packets are used to modulate a laser having wavelength $\lambda 2$ associated with port 2, and are inserted via OADM 154 onto transmission medium 160, which in this case is arranged to "add" the laser output to the signals already travelling in a counterclockwise direction on transmission medium 160. In this example, OADM 152 is arranged to extract (drop) the optical signal on transmission medium 160 at wavelength λ2 from the other WDM signals on the transmission medium, so that the information bearing packets can be recovered by demodulation in a transceiver in gateway 122.

While the first and second connections just described are ongoing, it will be observed that if a connection from gateway 121 to gateway 122 is concurrently requested, the request would have to be denied. This would be true even though gateway 121 has an idle port, namely port 2. This is because if port 2 were to be used, the incoming packets would be used to modulate a laser at wavelength λ2. This signal would be added at OADM 151 and dropped at OADM 152. While no interference would occur in the portion of transmission medium 160 between OADM 151 and OADM 154, it is noted that the same wavelength, λ2, would be used in the portion of transmission medium 160 between OADM 154 and OADM 152, causing impermissible interference. Accordingly, the general object of the present invention is to enable efficient allocation of network resources (e.g., bandwidth) in an optical WDM network, and provide the ability to internetwork optical and packet networks so as to provide truly guaranteed connections to satisfy service requirements. A specific object is to enable intermetworking of optical WDM and packet networks in a manner in which the previously described interference is avoided.

SUMMARY OF THE INVENTION

In accordance with the present invention, a connectionless packet network and an optical WDM network are interconnected by one or more optical interface modules (gateways) that include both optical to electrical interfaces, as well as a connection management module, or control element, that is arranged to control the OADM's and the configuration of lasers and port assignments within the gateways, such that a route through the optical network to a desired endpoint is selected.

In one embodiment of the present invention, the OADM's can be programmed, (i.e., locally or remotely controlled by the control element) such that the wavelengths that can be added or dropped by an OADM can be changed. This flexibility allows routes to be established through the optical network, from an originating gateway to a destination gateway, under circumstances such as those described above in conjunction with FIG. 1, where a route would otherwise be unavailable. In this embodiment, changes to the routing tables of at least some of the gateways are generally required. The programmable OADM's can use fiber Bragg grating technology in which the gratings are tuned using temperature or magnetic-strain. Alternatively, thin-film technology can be used in which tuning is realized by mechanically translating the filter.

In another embodiment of the present invention, the OADM's are programmable, and, in addition, the optical interface modules include a plurality of N tunable lasers, where N is an integer equal to the number of WDM channels present on the optical transmission medium. With this capability to change the wavelength of the laser associated with a particular port in the gateway, routes can be established through the optical network, from an originating gateway to a destination gateway, under circumstances such as those described above in conjunction with FIG. 1, where a route would otherwise be unavailable, and, in addition, changes to the routing table that associates particular endpoints with particular ports is advantageously not required. If the system is operated in a "provisioned" mode, where connections are set up a priori (i.e., before actual traffic flow starts), based upon resource requirements that are computed using some estimate of the expected traffic, the lasers can be re-tuned on a fairly infrequent basis On the other hand, when the system is operated in a "switched" mode, where connections are set up on a session by session (call by call) basis, the lasers can be re-tuned much more frequently. In this embodiment, transceiver within the interface modules are arranged to insert "fillers" into the optical outputs when no packet data is being inserted onto the WDM channels. This advantageously avoids the need for burst-mode receivers in the interface modules.

In still another embodiment of the present invention, the number of tunable lasers can be fewer than the number of WDM channels available on the optical transmission medium, in which case burst-mode receivers are required in the interface modules. Advantageously, in this arrangement, as in the one just described, the port assignments (routing table) in the gateways do not have to be changed.

The interface modules contemplated by the present invention can be physically integrated with the components otherwise present in conventional packet routers. Alternatively, these modules can be housed separately in intelligent gateways that interconnect conventional packet routers with OADM's on an optical WDM network. The WDM network can use dense wavelength division multiplexing, or, if desired, coarse WDM of the type described in an article entitled "Optical Networking", by Daniel Y. Al-Salameh et al., published in the *Bell Labs Technical Journal*, January–March 1998, pps. 39–61.

The connection management module is arranged to determine, in response to receipt of a stream of packets intended to be routed to a remote destination, the "shortest path" to that destination, which may be through the packet network or through the optical WDM network. If routing through to the optical network is preferred, the management module is arranged to (a) analyze the existing traffic on the optical network to determine if a route is available without changing existing light paths, and (b) if a route is available, to "set up" that route, and (c) if a route is not available, to appropriately control various elements in the optical network so as to both shift existing traffic to alternate routes as well as to set up the desired route. The "set up" just described may involve tuning the wavelength of a tunable laser, rearranging the port assignment of a fixed laser, and/or reconfiguring of the programmable OADM's. In some cases, the management module also needs to change routing tables in the optical interface modules.

BRIEF DESCRIPTION OF THE DRAWING

The present invention will be more fully appreciated by consideration of the following detailed description, which should be read in light of the accompanying drawing in which.

DETAILED DESCRIPTION

Figure 2:
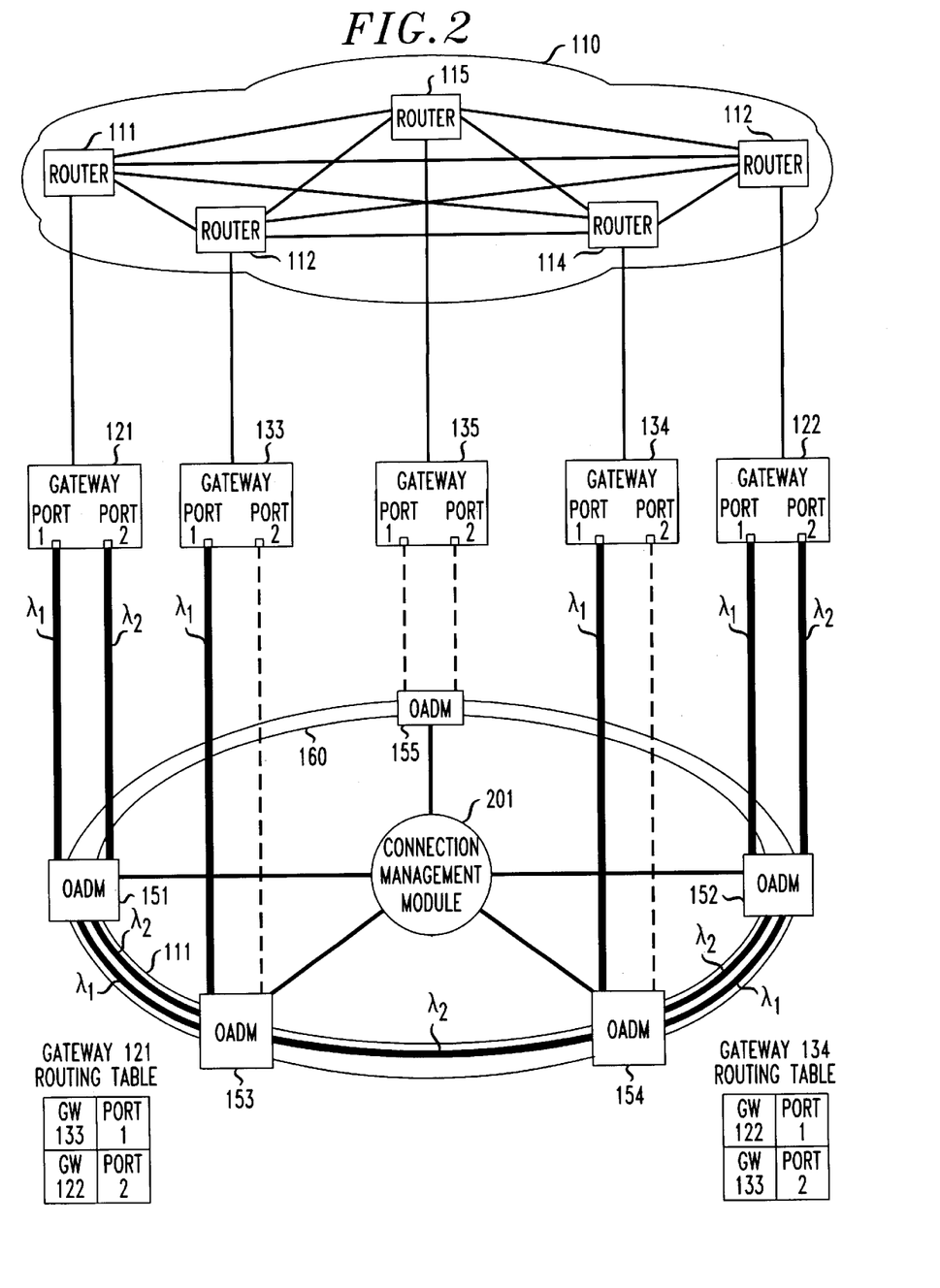
FIG. 2 is a diagram similar to FIG. 1, illustrating how a connection management module that can "program" the OADM's can establish a path through the optical network that could not be established in the arrangement of FIG. 1.

Referring now to FIG. 2, there is shown a diagram similar to FIG. 1, illustrating how a connection management module 201 connected to the OADM's can "program" one or more OADM's by changing the wavelength that is added and/or dropped, and thereby establish a path through the optical network that could not be established in the arrangement of FIG. 1. This is because the path which a packet takes through WDM network 150 is determined by the wavelength on which it enters the WDM network and the state of the particular ones of the OADMs 151–155 through which the packet travels. In FIG. 2, the same reference designations as used in FIG. 1 are retained. As in FIG. 1, it will be assumed that optical fiber transmission medium 160 is a unidirectional loop, with light travelling in a counter-clockwise direction. However, in most real implementations, two separate unidirectional loops carrying traffic in opposite directions are often used, such that a fault in an OADM or repeater can be handled by reconfiguring the two loops as a single loop that bypasses the fault.

In FIG. 2, consider an example in which router 111 has packet traffic to send to router 112. Advantageously, router 111 will be arranged to send data to router 112 through WDM network 150 rather than through IP network 110, if the path through network 150 is "shorter" than the path through network 110. (Each link is assigned a weight, and route "lengths" may be calculated using an algorithm such as, for example, the one described by Dijkstra in "Data Networks", by Bertsekas and Gallagher, Prentice Hall, 1991. If a route through WDM network 150 is used, GW 121 must set up a lightpath from OADM 151 to OADM 152 and thence to GW 122 in order to send the data received from router 111 to router 112.

Assume that communications between gateway 121 and gateway 133 are ongoing using λ1 and that communications between gateway 134 and gateway 122 are ongoing using λ2. Thus, when gateway 121 seeks to establish a path to gateway 122, an initial determination by connection management module 201 determines that a path is not available. However, if OADM's 154 and 152 are respectively arranged to add and drop wavelength λ1 rather than wavelength λ2, the same wavelength, λ1, would then be used on two segments, namely, to connect gateway 121 to gateway 133, and also to connect gateway 134 to gateway 122. In this event, wavelength λ2 is now available on which to establish the additional desired connection between gateway 121 and gateway 122. This is accomplished by connection management module 201 also controlling OADM's 151 and 152 to respectively add and drop that wavelength.

Note, in the embodiment of FIG. 2, after the OADM's are reprogrammed, the routing table in gateway 134 must be changed. Instead of port 2 being used for the connection to gateway 122, port 1 must be used, since that is the port associated with the laser at wavelength λ1. Note also that the arrangement illustrated in FIG. 2 is exemplary, in that the gateways are shown as distinct elements located between IP network 110 and WDM network 150. Alternatively, the functionality of the gateways can be provided either (a) within the routers to which the gateways are connected (i.e., gateway 121 could be part of router 111, gateway 122 could be part of router 112, etc.) and the routers would then be equipped with appropriate WDM line cards including the laser modulators, or (b) within the OADMs (i.e., gateway 121 could be part of OADM 151, gateway 122 could be part of OADM 152, etc.) and the OADM's would then be equipped with appropriate packet routers. As yet another alternative, some other combination of the foregoing could be arranged.

While the embodiment of FIG. 2 describes gateways and OADM's having the ability to use only two optical channels at wavelengths $\lambda_1$ and $\lambda_2$, it is to be understood that in a real implementation, a large number of WDM channels with different wavelengths will exist simultaneously on fiber transmission loop 160, and that the OADM's and gateways would have the capability of processing information on these channels in a manner similar to that just described.

Figure 3:
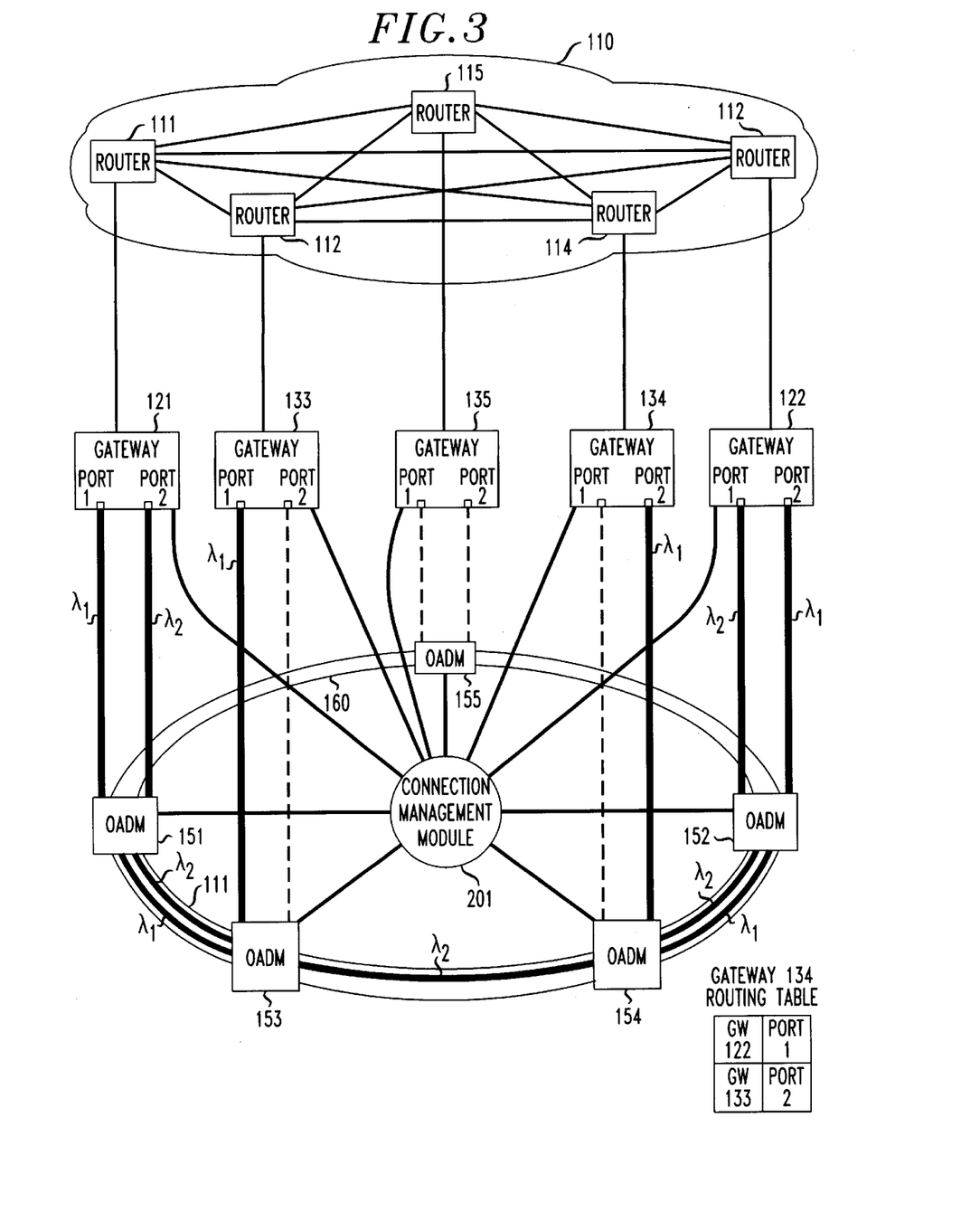
FIG. 3 is a diagram similar to FIG. 1, illustrating how a connection management module that can "program" the OADM's and control the wavelength of the lasers in the gateways, can establish a path through the optical network that could not be established in the arrangement of FIG. 1, without the need to change the routing tables in any of the gateways.

Turning now to FIG. 3, in which components like those in FIGS. 1 and 2 retain like designations, another embodiment of the present invention is illustrated in which, like the arrangement of FIG. 2, OADMs 151–154 are arranged to be reconfigured or programmable, but unlike the arrangement of FIG. 2, gateways 121, 122, 133 and 134 are arranged to include multiple tunable lasers. As will be seen, this advantageously enables a larger number of network connections to be supported than with fixed-wavelength lasers, while, at the same time, not requiring the routing tables in the gateways to be changed. In this embodiment, we assume that OADMs 151–154 on fiber transmission loop 160 are each able to add and drop only 2 wavelengths, $\lambda_1$ and $\lambda_2$. Furthermore, each gateway 121, 133, 134 and 122 includes two ports, called Port 1 and Port 2, as well as multiple tunable lasers, in this example, capable of being controllably tuned to wavelengths $\lambda_1$ or $\lambda_2$, depending upon control inputs received from connection management module 201.

Let us suppose that an initial condition exists in which the routing tables for gateways 121 and 134 are as shown in FIG. 1, and that the laser in port 1 of GW 121 is tuned to $\lambda_1$, which is used to support a connection from GW 121 to GW 133. At the same time, the laser in port 2 of GW 134 is tuned to $\lambda_2$, which is used to support a connection from GW 134 to GW 122.

Now, suppose that we wish to set up a new path (i.e., to make a new connection) from GW 121 to GW 122. At GW 121, $\lambda_1$ is already in use, and adding 2 would interfere with the GW 134 to GW 122 connection. If the lasers in GW 121 are fixed-wavelength, as would be found conventionally in known arrangements, then the connection request must be denied. However, if, in accordance with this embodiment of the present invention, multiple tunable lasers are available in GW 134, then the GW 121 to GW 122 connection request may be accommodated, as shown in FIG. 3. First, the laser in port 2 of GW 134 would be retuned to $\lambda_1$, to continue supporting the GW 134 to GW 122 connection. Now, the laser in port 2 of GW 121 may be tuned to $\lambda_2$, to accommodate the desired new GW 121 to GW 122 connection. Note that certain of the OADMs, namely OADMs 152 and 154, also needed to be reprogrammed. However, it was not necessary to change the routing table associated with gateway 134, as was the case in the embodiment described in connection with FIG. 2. In an actual implementation of this embodiment of the present invention, additional electronics and signaling capability would be built into the gateways to (a) identify which port, and hence which tunable laser, an IP packet will be passed to, and (b) to control the tuning of the lasers.

For the embodiment of FIG. 3 to work in the manner described above, in which the additional connection can be accommodated without a change in the routing tables, it is necessary that the number of tunable lasers available each gateway be equal to the number of wavelengths supported in the transmission medium. In this type of embodiment of the present invention, transceiver within the interface modules are arranged to insert "filters"into the optical outputs when no packet data is being inserted onto the WDM channels. This advantageously avoids the need for burst-mode receivers in the interface modules.

An alternative arrangement is possible, in which the number of tunable lasers available at each gateway is fewer than the number of wavelengths supported in the transmission medium. Reducing the number of tunable lasers is advantageous, because it reduces the overall cost of the system. However, that arrangement has the associated penalty of requiring the use of burst mode receivers, because with fewer tunable lasers than wavelengths, data will not be sent constantly on all wavelengths. Thus receivers that are capable of synchronizing quickly are needed. Such receivers are called "burst-mode receivers." Also, in this arrangement, routing table updates would also be required, because when a connection is set up using some wavelength, the wavelength could be associated with a port different from the port indicated to reach the destination in the routing table.

Figure 4:
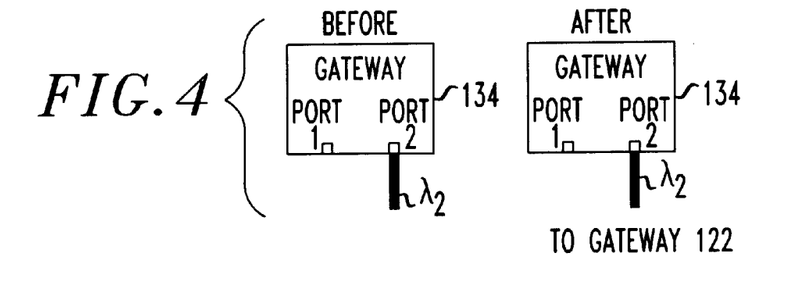
FIGS. 4–6 are diagrams that show the "before" and "after" status of gateway 134 in the arrangements depicted in FIGS. 1–3 respectively, wherein the before status represents the case where a first lightpath exists between gateway 121 and gateway 133 with wavelength λ1 and a second lightpath exists between gateway 134 and gateway 122 with wavelength λ2 and wherein the "after" status represents the case where an additional lightpath is requested to connect gateway 121 to gateway 122.
Figure 5:
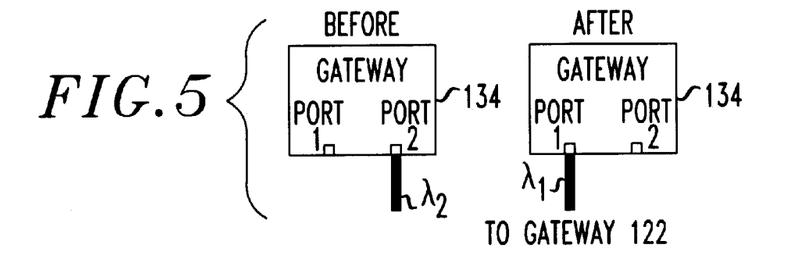
Figure 6:
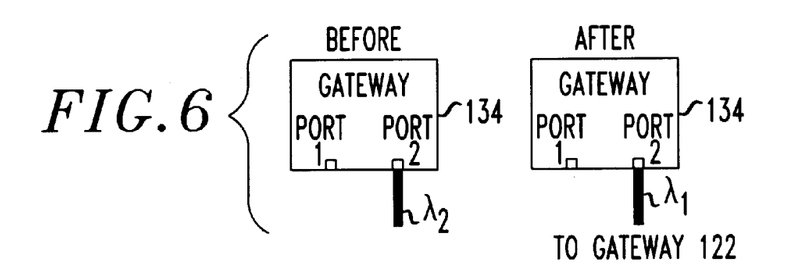

The differences between the arrangements of FIGS. 1, 2 and 3 is further illustrated by reference to FIGS. 4–6, which focus on and show the status of gateway 134 "before" (when a first lightpath exists between gateway 121 and gateway 133 with wavelength $\lambda_1$ and a second lightpath exists between gateway 134 and gateway 122 with wavelength $\lambda_2$) and "after", when an additional lightpath is requested to connect gateway 121 to gateway 122, in the situations depicted in FIGS. 1–3, respectively. With respect to FIG. 4, which corresponds to the situation of FIG. 1 in which the OADM's are not programmable and the lasers are not tunable, in the "before" status, gateway 134 supports the connection to gateway 122 via a lightpath with wavelength $\lambda_2$ using port 2 of that gateway. In this figure, the "after" status has not changed, since the requested connection could not be supported. With respect to FIG. 5, which corresponds to the situation of FIG. 2 in which the OADM's are programmable but the lasers are not tunable, the "after" status has changed, such that the connection from gateway 134 to gateway 122 is now supported by a lightpath of wavelength $\lambda_1$ via port 1. As noted previously, the routing table in gateway 134 must be altered accordingly. With respect to FIG. 6, which corresponds to the situation of FIG., 3 in which the OADM's are programmable and the lasers are tunable, the "after" status has changed, such that the connection from gateway 134 to gateway 122 is now supported by a lightpath of wavelength $\lambda_1$ via port 2. The routing table in gateway 134 need not be altered in this embodiment.

Before proceeding with a description of the control process of the various embodiments of the present invention, it is important to point out that the invention is applicable both in "switched" and "provisioned" modes of operation. In the switched mode of operation, it is contemplated that the lightpaths that enable the connections between gateways are established and maintained only for the duration of a single session or "call" (i.e., the transmission of a series of packets between a specific source and destination that continues during a limited, relatively short, time period), and that the available bandwidth on the fiber transmission loop is then released and reused for subsequent connections. The connection management control elements that enable the switched mode of operation can advantageously be distributed in the interconnected individual routers and gateways that together form the communication system. On the other hand, in the provisioned mode of operation, the OADMs and lasers that are involved in a connection or lightpath are reconfigured or retuned infrequently. This arrangement is well suited for long-term "lease-a-wavelength" applications. Here, the connection management control elements that enable the provisioned mode of operation can advantageously be centralized in a single network management system and executed a priori, i.e., when the communication system is initially set up.

The benefit afforded by the present invention is greater in the switched mode than in the provisioned mode, since it is here that frequent updates to the routing tables would otherwise be required. Our invention advantageously reduces the processing load placed on the elements in the system that control packet routing, and this reduction is especially dramatic for switched mode operation. Said differently, our invention is a solution for internetworking WDM and packet networks in a manner that enables highly efficient resource utilization with reduced layer 3 processing, to be realized by combining signaling/routing protocol software with tunable laser/OADM WDM technology.

Figure 7:
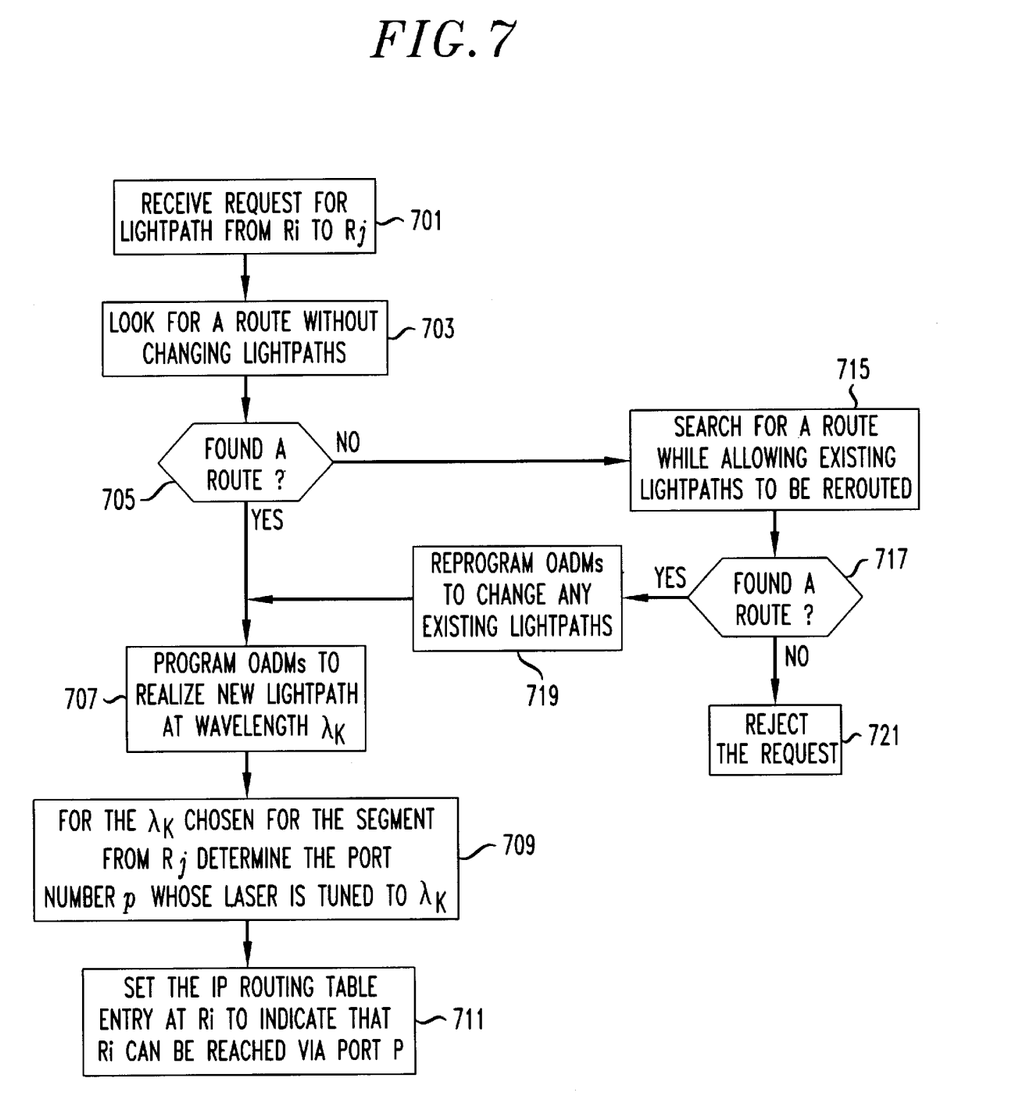
FIG. 7 is a diagram illustrating the process by which the arrangement of FIG. 2, in which the OADM's are programmable and the gateways include multiple fixed lasers, can be operated to enable a requested connection between gateways.

Referring now to FIG. 7, there is shown a diagram illustrating the process by which the arrangement of FIG. 2, in which the OADM's are programmable and the gateways include multiple fixed lasers, can be operated to enable a requested connection between gateways. The process begins in step 701, in which a request is received in connection management module 201 for a lightpath from a first (source) gateway or router Ri to a second (destination) gateway or router Rj. In step 703, connection management module 201 looks to see if a route can be found for the requested path without changing any existing lightpaths. This involves consulting a status table or querying the various network elements. If a route can be found, a positive or "yes" result occurs in step 705, and the process proceeds to step 707. Otherwise, if a route cannot be found, a negative or "no" result occurs in step 705, and the process proceeds to step 715.

In step 707, the OADM's involved in the new lightpath are appropriately programmed to add and drop wavelength $\lambda k$, in order to realize the desired new lightpath. In step 709, the identity of the port p in Ri whose laser is tuned to wavelength λk is determined. Then, in step 711, the IP routing table entry in router Ri is updated to indicate that Rj can be reached via port p. The process then terminates. If a no result occurs in step 705, connection management module 201 searches for a route through the network that could be set up after rerouting one or more existing. lightpaths. Clearly, such rerouting should be minimized, if possible. If a route is found, a positive or "yes" result occurs in step 717. Then, in step 719, the affected OADM's are reprogrammed so as to appropriately change the existing lightpaths, after which the process proceeds to step 707 in order to setup the new lightpath in the manner previously described. If a route is not found in step 715, a negative or "no" result occurs in step 717, and; the requested route must be rejected in step 721, whereupon the process is terminated.

Figure 8:
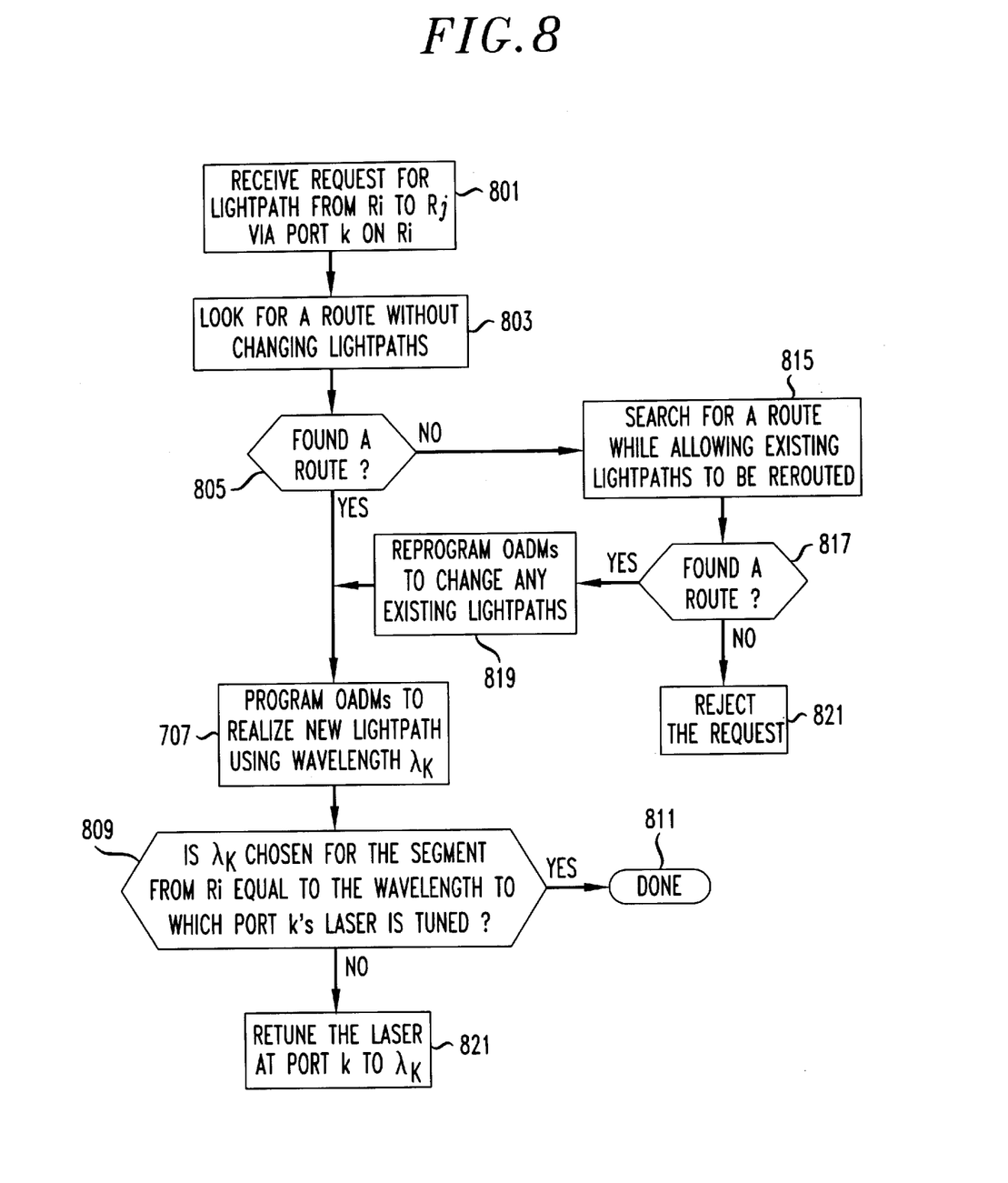
FIG. 8 is a diagram illustrating the process by which the arrangement of FIG. 3, in which the OADM's are programmable and the gateways include as many multiple tunable lasers as there are wavelengths supported in the optical transmission medium, can be operated to enable a requested connection between gateways.

Referring now to FIG. 8, there is shown a diagram illustrating the process by which the arrangement of FIG. 3, in which the OADM's are programmable and the gateways include as many multiple tunable lasers as there are wavelengths supported in the optical transmission medium, can be operated to enable a requested connection between gateways. The process begins in step 801, in which a request is received in connection management module 201 for a lightpath from a first (source) gateway or router Ri to a second (destination) gateway or router Rj. Because this arrangement is achieved without changing routing tables, the request identifies the port k on Ri that is to be used. In step 803, connection management module 201 looks to see if a route can be found for the requested path without changing any existing lightpaths. This involves consulting a status table or querying the various network elements. If a route can be found, a positive or "yes" result occurs in step 805, and the process proceeds to step 807. Otherwise, if a route cannot be found, a negative or "no" result occurs in step 805, and the process proceeds to step 815.

In step 807, the OADM's involved in the new lightpath are appropriately programmed to add and drop wavelength λk, in order to realize the desired new lightpath. In step 809, a determination is made as to whether λk is the wavelength to which port k's laser is tuned. If so, a positive or "yes" result occurs in step 809, and the process is terminated in step 811. If not, a negative or "no" result occurs in step 809, and the process proceeds to step 813, in which the tunable laser at port k is retuned to wavelength λk.

If a no result occurs in step 805, connection management module 201 searches for a route through the network that could be set up after rerouting one or more existing lightpaths. Clearly, such rerouting should be minimized, if possible. If a route is found, a positive or "yes" result occurs in step 817. Then, in step 819, the affected OADM's are reprogrammed so as to appropriately change the existing lightpaths, after which the process proceeds to step 807 in order to setup the new lightpath in the manner previously described. If a route is not found in step 815, a negative or "no" result occurs in step 817, and the requested route must be rejected in step 821, whereupon the process is terminated.

Figure 9:
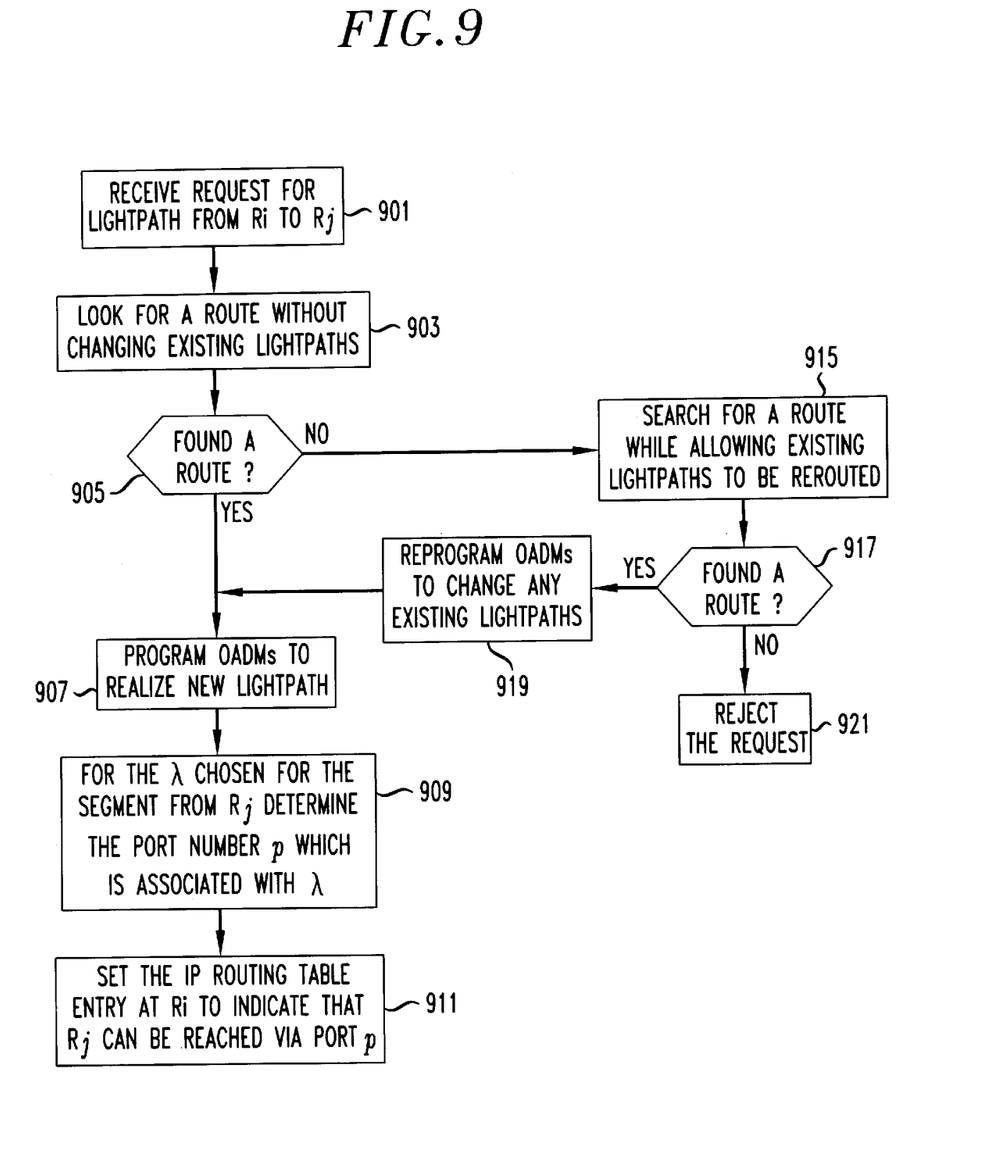
FIG. 9 is a diagram similar to FIG. 8, in which the OADM's are programmable and the gateways include fewer tunable lasers as compared to the number of wavelengths supported in the optical transmission medium.

Referring now to FIG. 9, there is shown a diagram similar to FIG. 8, in which the OADM's are programmable and the gateways include fewer tunable lasers as compared to the number of wavelengths supported in the optical transmission medium. The process begins in step 901, in which a request is received in connection management module 201 for a lightpath from a first (source) gateway or router Ri to a second (destination) gateway or router Rj. Because this arrangement cannot be achieved without changing routing tables, the request does not identify in advance a particular port on Ri that is to be used. Rather, that port is determined later in the process.

In step 903, connection management module 201 looks to see if a route can be found for the requested path without changing any existing lightpaths. This involves consulting a status table or querying the various network elements. If a route can be found, a positive or "yes" result occurs in step 905, and the process proceeds to step 907. Otherwise, if a route cannot be found, a negative or "no" result occurs in step 905, and the process proceeds to step 915.

In step 907, the OADM's involved in the new lightpath are appropriately programmed to add and drop wavelength λk, in order to realize the desired new lightpath. In step 909, a determination is made as to a port number pk which can be associated with wavelength λk. The process then proceeds to step 911, in which the entry in the routing table at Ri is changed to indicate that Rj can be reached via port pk.

If a no result occurs in step 905, connection management module 201 searches, in step 915, for a route through the network that could be set up after rerouting one or more existing lightpaths. Clearly, such rerouting should be minimized, if possible. If a route is found, a positive or "yes" result occurs in step 917. Then, in step 919, the affected OADM's are reprogrammed so as to appropriately change the existing lightpaths, after which the process proceeds to step 907 in order to setup the new lightpath in the manner previously described. If a route is not found in step 915, a negative or "no" result occurs in step 917, and the requested route must be rejected in step 921, whereupon the process is terminated.

There are several options for remote programming of the OADMs. For example, if fiber Bragg grating technology is used, the gratings may be tuned using temperature or magnetic-strain. For thin-film technology, tuning may be realized by mechanically translating the filter. Programmable OADMs in the provisioned mode may be reconfigured on a slow timescale. In this case, temperature-tuned fiber Bragg gratings (FBG), for example, would be used. In the switched mode, the OADMs would be reprogrammed on a session-by-session basis, during connection setup. Here, technology such as magnetically-strained FBGs, which offers programmability on a millisecond timescale, would be used.

Various modifications and adaptations of the present invention are possible. Accordingly, the present invention is to be limited only by the appended claims.

What is claimed is:

1. A system for interconnecting a connectionless packet network with an optical WDM network including
   a plurality of programmable optical add/drop multiplexers (OADMs) interposed on an optical communication medium and arranged to add and extract selected wavelengths from said optical communication medium,
   a plurality of gateways that each include a multiport optical interface to an associated programmable OADM in said WDM network and an electrical interface to a router in said packet network, and
   a connection management module arranged to select a route through the optical communication medium from an originating gateway to a desired destination gateway by (a) controlling the selection of wavelengths added or dropped by ones of said programmable OADM's, and (b) controlling the assignment of ports in said gateways to corresponding destinations in said packet network.

2. The invention defined in claim 1 wherein the programmable OADM's use fiber Bragg grating technology in which the gratings are tuned using temperature or magnetic-strain.

3. The invention defined in claim 1 wherein the programmable OADM's use thin-film technology realized by mechanically translating a filter.

4. A system for interconnecting a connectionless packet network with an optical WDM network, including a plurality of gateways that include an optical interface to said WDM network and an electrical interface to said packet network, each of said gateways having (a) a plurality of N tunable lasers, where N is an integer equal to the number of WDM channels present on an optical transmission medium, each of said lasers being connected to said optical transmission medium via an associated port, and (b) an associated optical add/drop multiplexer (OADM) arranged to add and extract selected wavelengths from said optical communication medium, and a connection management module arranged to control the selection of wavelengths within the OADM's and the tuning of said lasers in order to select a route through the optical communication medium from an originating gateway to a desired destination gateway without interfering with previously established communications between other ones of said gateways and without changing the routing table that associates particular ports with particular gateways.

5. The invention defined in claim 4 wherein the system is operated in a provisioned mode, whereby connections are set up before actual traffic flow starts, based upon resource requirements computed using an estimate of the expected traffic between said packet and optical networks.

6. The invention defined in claim 4 wherein the system is operated in a switched mode, whereby connections between said packet and optical networks are set up on a session by session basis.

7. The invention defined in claim 4 wherein transceivers within the gateways are arranged to insert fillers into the optical outputs when no packet data is being inserted onto the WDM channels.

8. A system for interconnecting routers in a connectionless packet network with optical add/drop multiplexers (OADMs) interposed on an optical communication medium to form an optical WDM network, said system including a plurality of gateways that include an optical interface to said OADMs and an electrical interface to said routers, each of said gateways having a plurality of N tunable lasers, each of said lasers being connected to said optical transmission medium via an associated port, and a connection management module arranged to select a route through said optical communication medium from an originating gateway to a destination gateway by (a) controlling said OADM's to selectively add and extract selected wavelengths from said optical communication medium, and (b) tuning the wavelengths of selected ones of said lasers.

9. The invention defined in claim 8 wherein N is an integer less than the number of WDM channels present on said optical transmission medium, and wherein said connection management module is further arranged to assign particular ones of said lasers to selected ones of said ports.

10. The invention defined in claim 8 wherein N is an integer equal to the number of WDM channels present on said optical transmission medium, whereby said route is selected without interfering with previously established communications between other ones of said gateways and without changing the routing table that associates particular lasers in said gateways with particular ones of said ports.

11. The invention defined in claim 9 wherein each of said gateways includes a burst-mode receiver.

12. A method of operating a connection management module for controlling a communication system including a packet network interconnected with an optical network, including the steps of determining, in response to receipt of a stream of packets intended to be routed to a remote destination, the preferred route to that destination, which may be through the packet network or through the optical WDM network, if routing through to the optical network is the preferred route, (a) analyzing the existing traffic on the optical network to determine if a route is available without changing existing light paths, and (b) if a route is available, setting up that route, and (c) if a route is not available, appropriately controlling various elements in the optical network so as to both shift existing traffic to alternate routes as well as to set up the desired route by controlling the selection of wavelengths added or dropped within a route, and by controlling the assignment of ports in gateways used to interconnect to corresponding destinations in said packet network.

13. The method defined in claim 12 wherein the step of setting up includes tuning the wavelength of a tunable laser.

14. The method defined in claim 12 wherein the optical network includes a plurality of gateways each arranged to transmit packets by modulating a particular one of a plurality of fixed wavelength lasers, and wherein the step of setting up includes selecting said particular one of said lasers.

15. The method defined in claim 12 wherein the optical network includes a plurality of programmable OADM's each arranged to add and extract selected wavelengths, and wherein the step of setting up includes reconfiguring of the programmable OADM's.

16. The method defined in claim 12 wherein said optical network includes multiport gateways arranged to transmit packets by modulating lasers associated with said ports, and wherein the step of setting up includes changing routing tables that associate particular destinations with particular ones of said ports.

17. An arrangement for interconnecting nodes in a packet transmission network, including a plurality of gateways, an optical communication network including a plurality of programmable OADM's for transmitting information via WDM channels, portions of said information being associated with different ones of a plurality of calls transmitted through said network, wherein said gateways are arranged to control said programmable OADM's to establish, on a per-call basis, a specific WDM channel through the optical network.

18. The invention defined in claim 17 wherein said WDM channels are established using tunable lasers.

19. A gateway for interconnecting a router in a packet network with at least one programmable OADM in an optical network, whereby information bearing packets associated with a plurality of individual calls originated in said packet network are transmitted toward respective destinations via said optical network, said gateway comprising means for tuning a laser in said at least one programmable OADM to set up, on a call by call basis, a path through said optical network on a specific, unused WDM channel, and means for modulating said tuned laser in accordance with information bearing packets received from said packet network.

* * * * *